Patented June 11, 1946

2,401,884

UNITED STATES PATENT OFFICE 2,401,884

ALKYLATION PROCESS AND CATALYST THEREFOR

Walter A. Schulze and William N. Axe, Bartlesville, Okla., assignors to Phillips Petroleum Company, a corporation of Delaware No Drawing. Application December 16, 1942,
Serial No. 469,213

5 Claims. (Cl. 260—683.4)

This invention relates to the synthesis of liquid hydrocarbons by catalytic alkylation. In one modification this invention relates to a process for the catalytic alkylation of low-boiling isoparaffins with olefins in the presence of certain catalysts wherein important benefits are obtained by a novel use of olefins to control catalyst activity and product composition. In a more specific modification the invention embodies an improved method for the utilization of catalysts containing boron fluoride in the selective synthesis of high octane isoparaffin blending agents for aviation fuels.

It is known that the condensation of certain low molecular weight alkylatable hydrocarbons such as isobutane, benzene, and homologs with olefins may be effected in the presence of various catalysts to yield higher molecular weight hydrocarbons of great value in the manufacture of motor and aviation fuels, fuel additives, and related materials. The catalytic promotion of such condensations by agents such as the aluminum halides, other metal halides, strong mineral acids, and the like, has been proposed, with each type of catalyst exhibiting certain characteristics with regard to activity, selectivity and service life when applied to various hydrocarbon feed stocks.

More recently, in order to extend the alkylation synthesis to a broader range of reactants, and/or to increase yields of particularly valuable compounds, specific attention has been given to the development of catalysts of greater activity on the one hand, and correspondingly improved selectivity on the other. In this manner, the activity and composition of certain catalysts have been employed to control both the molecular weight and the molecular structure of the hydrocarbons synthesized, and hence, to control the boiling range, octane number, and combustion characteristics of the alkylate.

Among the alkylation catalysts which have outstanding qualities for the synthesis of high octane fuel components are those containing liquid inorganic complex compounds of boron fluoride, or which are promoted by boron fluoride in free or combined state. Such catalysts include boron fluoride-phosphoric acid complexes, boron fluoride hydrate, and the hydrate promoted with minor proportions of hydrogen halides, particularly hydrogen fluoride. These catalysts exhibit a high degree of activity, being capable of promoting ethylene alkylation under mild conditions, and, therefore, promote extremely rapid alkylation with more reactive olefins of three or more carbon atoms. However, said catalysts by virtue of their activity are somewhat more conducive to polymerization or other side reactions involving the $C_3$ and higher olefins, and may produce therefrom somewhat larger proportions of alkylate boiling above the aviation fuel range.

Another difficulty encountered in the utilization of alkylation catalysts containing boron fluoride, particularly with the higher olefins, has been due to relatively rapid changes in catalyst composition during use. These changes are often observed in both physical and chemical properties of the catalyst and are apparently dependent to a degree on the properties of the olefin present in the reactant feed. While the exact nature of the chemical reactions which precede and/or result in these changes are not always known, the effects in the case of the higher olefins are usually noted in increased catalyst consumption and the production of a lower quality alkylate. The increased catalyst consumption may be associated with poor response of partially deactivated catalysts to reactivating treatments, or with the production of heavy viscous oils, non-hydrocarbon impurities or other by-products in either the hydrocarbon or the catalyst phase. The deterioration of alkylate quality may be noted in increased formation of high boiling compounds including unsaturates and in the formation of smaller proportions of the high octane-number isomers of isoparaffinic products.

It is an object of this invention to provide an improved process for conducting alkylation reactions.

Another object of this invention is to prolong the period of maintained activity of alkylation catalysts containing boron fluoride.

A further object of this invention is to provide an alkylation process wherein the catalyst composition may be effectively stabilized against undesirable olefin absorption and/or reaction in the catalyst phase.

A still further object of this invention is to provide alkylation catalysts containing boron fluoride which exhibit improved activity and stability, and which are capable of producing larger yields of higher quality alkylate.

Further objects and advantages of our invention will become apparent, to one skilled in the art, from the accompanying disclosure and discussion.

We have now discovered that greatly improved results may be obtained in reactions utilizing certain highly active alkylation catalysts of the type described to promote alkylation with olefins when the catalysts are pretreated and/or conditioned with an olefin having a fewer number of carbon atoms per molecule than the olefin used as the principal alkylating reactant. Within the scope of this invention, when $C_3$ or higher olefins are employed in alkylation, the catalyst is pretreated or otherwise contacted with ethylene from an external source, or ethylene is incorporated in the olefin feed stock in amounts sufficient to produce the desired conditioning effect.

In one specific embodiment of the present process, a catalyst to be used in the alkylation of light isoparaffins with $C_3$ or higher olefins, e. g., butylenes, is prepared by forming an inorganic complex with boron fluoride, itself somewhat active as an alkylation catalyst, and subjecting this inorganic complex to treatment with ethylene prior to contact with mixtures containing said isoparaffins and higher olefins. The extent of such pretreatment may be controlled according to the extent of catalyst modification desired, and said modification may be judged by certain changes in catalyst properties as described hereinafter.

Such a process is adapted to integration with another alkylation process employing a similar catalyst in ethylene alkylation, since batches of catalyst may be continuously or intermittently provided for use in alkylation with butylenes or higher olefins. If necessary appropriate reactivation treatment may be applied during transfer of the catalyst from one service to the other.

As a further method for accomplishing the modification of catalysts, ethylene may be incorporated in the olefin feed to an alkylation process. In such an embodiment sufficient ethylene may be added to obtain the desired modification of the catalyst, although the proportion of ethylene may be minor and productive of correspondingly minor quantities of alkylate from ethylene. However, in other instances, relatively large proportions of ethylene may be employed to produce both modification of the catalyst and high quality alkylate. The alkylate produced in the latter case may be particularly valuable because of the presence of high octane number isohexanes which give a balanced boiling range and improved "rich mixture" rating, when alkylating isobutane.

Furthermore, the proportions of ethylene may be varied during the service period of a batch of catalyst. In some cases, relatively large proportions of ethylene may be employed at the beginning to give an initial modification of the catalyst and only enough added thereafter to maintain a desired state of catalyst activity. Thus, when the catalyst activity and composition have become established the incorporation of an olefin of low molecular weight, such as ethylene, in an amount of between about 1 and about 10 mol per cent of the total olefin in the feed is generally sufficient to maintain the catalyst composition relatively steady and the activity at a high value. These and other embodiments such as the addition of ethylene and catalyst promoters such as boron fluoride simultaneously during catalyst reactivation, and the improved results as defined herein will be apparent from the accompanying disclosure.

In pretreating a catalyst with ethylene, one suitable method consists in contacting the catalyst with a liquid or gaseous hydrocarbon mixture containing about 5 to about 10 weight per cent of ethylene for a brief period under conditions approximating those to be employed in alkylation to effect a partial transfer of ethylene to the catalyst phase. It is preferred to employ liquid hydrocarbon in this step since the passage of hydrocarbon vapors through the liquid catalyst may result in the entrainment and loss of a volatile catalyst component. In many cases, ethylene may be the only olefin present in a pretreating step, although ethylene-containing mixtures with other olefins may be employed.

When ethylene is incorporated in a $C_3$, or higher, olefin feed stock during the alkylation process, the concentration of ethylene may be conveniently calculated on the basis of the molar proportions of ethylene in the olefin feed. In such applications, satisfactory ethylene concentrations may range from about 10 to about 50 mol per cent of ethylene in the total olefin in the feed mixture. These values may depend somewhat on the overall isoparaffin-olefin ratio, since with very low total olefin concentrations larger relative proportion of ethylene may be required to accomplish the desired results.

In the alkylation operation, a suitable catalyst composition, often in liquid form, is brought into intimate contact with a hydrocarbon mixture containing alkylatable hydrocarbon and olefin in suitable proportions. The hydrocarbons are maintained in contact with the catalyst for a period of time sufficient to bring about conversion of the reactants to higher molecular weight hydrocarbons after which hydrocarbon and catalyst phases are separated, and the alkylate segregated by conventional fractionation operations.

With an immiscible liquid catalyst contact with the hydrocarbons, which are preferably in liquid phase, may be obtained by various types of mixing devices such as mechanical stirrers, turbomixers, jet mixers, recirculation pumps, or film contact over inert supports such as carbon rings or other packing. In the reaction mixture, transfer of hydrocarbons, particularly olefins, to the catalyst phase usually occur, and unstable or volatile components of the catalyst may be transferred to the hydrocarbon phase. Neither of these effects is permanently harmful, and one or both may be in many cases, essential to the conduct of the reaction. Catalyst components in the hydrocarbon phase are usually recoverable by conventional means, so that a temporary or transient change in activity may be the principal effect and may be compensated for by various operational procedures. However, the reactions involving olefins in the catalyst phase often affect both catalyst life and the alkylate product.

The catalyst compositions which are the particular subject of this invention are prepared by treating a primary catalyst ingredient, such as water and/or phosphoric acid, with boron fluoride until substantially complete saturation is realized. The quantity of boron fluoride absorbed depends on the composition of the primary catalyst ingredient. In the case of water alone the boron fluoride absorption corresponds to the formation of a hydrate containing approximately equimolal quantities of water and boron fluoride. When acids of phosphorus, or aqueous solutions thereof, are the absorbing medium, the saturated composition corresponds to equi-molal combinations of boron fluoride with both the acid and the water present. In most cases the resulting inorganic complexes are normally in a liquid state.

In the case of boron fluoride hydrate promoted with hydrogen halides, an aqueous solution of the hydrogen halide is used to absorb boron fluoride. In saturating aqueous hydrogen fluoride solution, the boron fluoride absorbed corresponds to approximately one mol per mol of water in the solution. This catalyst composition, therefore, appears to be a chemical combination between the boron fluoride hydrate and the hydrogen fluoride, since compositions containing less than one mol of hydrogen fluoride per mol of boron fluoride hydrate apparently contain no free hydrogen fluoride.

When ethylene is the olefin used to treat the boron fluoride complex, it appears that a definite chemical reaction takes place so that the actual catalytic material which results and which is subsequently employed is a complex, or compound, of ethylene, boron fluoride and another constituent such as water and/or phosphoric acid. When inorganic complexes of boron fluoride, of the type described herein which are susceptible to modification by olefins, are treated with low-boiling olefins other than ethylene certain effects are noted paralleling to some extent those noted with ethylene. Absorption of olefin by the catalyst occurs and after relatively long periods of use the catalyst may contain oils which separate under conditions of temperature, dilution, etc., which alter or destroy all or a portion of the catalyst composition and activity. Thus, when another olefin, having a fewer number of carbon atoms per molecule than the olefin alkylating reactant, such as propylene is employed it appears that a similar, though less stable complex results.

The catalysts thus resulting from treatment with ethylene are, however, somewhat more stable, with regard to activity and composition, than are similar catalysts resulting from treatment with higher olefins. While the exact reasons for this difference are not known, the behavior of the ethylene-containing catalysts indicates the formation of a relatively stable ethylene complex or addition compound which remains at a relatively constant composition as long as the proportions of the other components of the catalyst composition are substantially unchanged. The higher olefins apparently form less stable or different complexes which may increase in concentration until polymerization, substitution, or other side reactions reduce or convert the olefin content.

Still more important to the present process is the fact that catalysts which result from treatment with ethylene do not undergo deterioration when employed with higher olefins at the same rate as is observed when ethylene is absent. In fact ethylene treatment seems to adjust the activity of the catalysts to a more favorable level for alkylation with higher olefins, producing higher alkylate yields with suppression of side reactions. This effect indicates that whatever complex or intermediate is formed between the catalyst and ethylene is sufficiently more stable than corresponding products of the higher olefins to effectively suppress the undesirable reactions of the higher olefins.

When catalysts of the type described herein are employed in alkylation reactions involving ethylene as the only olefin alkylating agent it has been found that a highly selective reaction occurs, producing alkylate substantially all in the gasoline boiling range and containing hydrocarbons of highly branched chain structure. This selectivity in alkylation may be much lower when a higher olefin is the alkylating agent unless the catalyst is pretreated with an ethylene-containing mixture and/or effective quantities of ethylene are contained in the higher olefin feed stream. Either of these arrangements results in improved alkylate quality, whereas, with the higher olefin alone, the alkylate often contains increased amounts of heavy ends, and may be deficient in high octane number components.

The apparent stability of catalyst compositions resulting from treatment with ethylene is such that the resulting catalysts may be used for relatively long periods with higher olefins at a satisfactory level of activity or conversion. Eventual spending or deactivation of the catalysts is, however, usually deferred when an effective proportion of ethylene is present in the higher olefin feed. Since the inclusion of ethylene may involve higher operating pressures, the choice of operating procedures and olefin feed compositions will depend on economic factors such as overall catalyst consumption and costs and the comparative value of the alkylates produced.

In many cases, the continuous use of ethylene is preferred since the catalyst is maintained in a state more favorable to periodic reactivation. Catalysts containing boron fluoride complexes, for example, are often reactivated by periodic injection of boron fluoride or a hydrogen halide when such a promoter is employed. When these catalysts are used with an ethylene-containing feed stock the response to reactivation is greatly improved and the frequency of reactivation is correspondingly reduced. When the selectivity of alkylation depends on a certain high level of catalyst activity the response to reactivation may enhance the economic value of the process by reducing catalyst consumption.

In reactions employing catalysts resulting from treatment with such lower boiling olefins the conditions are usually chosen so as to favor efficient utilization of the olefin alkylating reactant and the production of high quality alkylate. The temperature range corresponds to the range in which the catalyst is stable and in which reaction rates are satisfactory. With the boron fluoride complex catalysts temperatures are usually in the range of about atmospheric to about 150° F. Higher temperatures may cause catalyst alteration or produce a less valuable alkylate, while lower temperatures may reduce the reaction rate to an uneconomic level.

Relatively narrow portions of the operable temperature range may be selected in processes directed to the synthesis of a particular hydrocarbon or of an alkylate containing major proportions of highly branched chain compounds. For example when boron fluoride hydrate-hydrogen fluoride catalysts are employed with ethylene-propylene or ethylene-butylene feeds to produce both 2,3-dimethyl-butane and higher branched heptanes and octanes, the temperature may be regulated to the range of about 110 to about 150° F.

Pressures in the various applications of the process are ordinarily adjusted to maintain the hydrocarbons substantially in liquid phase during the alkylation reaction. This requires adjustment of the operating pressure to the hydrocarbon feed stock composition and the reaction zone temperatures. In the alkylation of isobutane and homologs with $C_3$ and higher olefins, pressures may range from about 50 to about 200 pounds gage, while with ethylene in the reaction mixture somewhat higher pressures up to about 500 pounds gage may be necessary.

While most of the catalysts employed in the process are selective in formation of high quality alkylate, it is often preferred to favor both selective alkylation and long catalyst life by providing an excess of isoparaffin in the feed to the alkylation zone. The isoparaffin-olefin molar ratio in the feed stock is, therefore, nearly always above 1:1 and still higher ratios of 3:1 up to about 10:1 often produce a better alkylate and aid in maintenance of the catalyst activity. This last named effect is most pronounced, when butylenes or amylenes are present in major proportions in the total olefin feed. When mixed olefin feed stocks are employed, the molar ratios are usually computed on the basis of the total olefin present. Paraffin to olefin ratios in the reaction zone may often be much higher, such as of the order of 50:1 to 100:1 or more.

The contact time or residence time of hydrocarbons in contact with the catalyst may be selected, if desired, to produce substantially complete utilization of the olefins in the feed mixture. This arrangement, together with suitable adjustment of the isoparaffin-olefin molar ratio is usually most satisfactory. Within the limits of the reaction conditions described above, suitable contact times with efficient contacting devices are ordinarily from about 10 to about 100 minutes. Shorter or longer contact may be employed, although incomplete reaction or excessive catalyst degradation may result, at the corresponding extremes.

The volume ratio of hydrocarbon and catalyst in the reaction zone is usually adjusted to give the intimacy of contact required for rapid and complete reaction. In this connection, it is noted that an immiscible liquid catalyst which contains moderate amounts of catalyst-soluble materials such as are produced by treatment with ethylene, or other lower-boiling olefins as discussed, is more easily mixed with the liquid hydrocarbons to the extent required for rapid reaction. This effect may be partly due to the action of the dissolved materials and enables the use of smaller volumes of catalyst in the reaction zone. In this manner, important economies may be realized in those reactions utilizing expensive catalysts or those relatively quickly deactivated in service.

As mentioned above, in many alkylation reactions, the quality and composition of the alkylate may vary markedly with the activity level or composition of the catalyst. As a result, a catalyst may produce high quality alkylate when highly active and low quality alkylate as the activity declines and the promoting substances in the catalyst responsible for the synthesis of certain highly branched compounds are altered or destroyed. It is a particular advantage of the present process that the catalysts employed according to the terms disclosed are maintained at a more favorable activity level over long periods of use, and furthermore are maintained in a condition such that excellent response to reactivation treatment is obtained. The benefits of ethylene as a component of the catalyst are further illustrated in the following examples of specific applications of the process.

*Example 1*

A catalyst composition containing boron fluoride hydrate and hydrogen fluoride was prepared by saturating a 50 weight per cent aqueous solution of HF with gaseous $BF_3$. This liquid catalyst was employed in the alkylation of isobutane with propylene in a continuous reaction. A feed mixture containing isobutane and propylene in the molar ratio of 3.8:1 was contacted with the catalyst in a turbo-mixer at 120–130° F. and 200 pounds gage pressure. The residence time of hydrocarbons in the reaction zone was approximately 70 minutes. The stabilized alkylate yield was 180 weight per cent of the propylene charged. Characteristics of the aviation fuel fraction from the alkylate were as follows:

| Composition: | Vol. per cent |
|---|---|
| $C_6$ | 16 |
| $C_7$ | 47 |
| $C_8$ | 12 |
| $C_9+$ | 25 |
|  | 100 |

A. S. T. M. octane number, 82.7.

When the alkylation was carried out with an identical catalyst composition and under substantially the same operating conditions, but with the olefin feed composed of ethylene and propylene in equi-molal quantities, the alkylate yield was 220 weight per cent of the olefin charged.

Characteristics of the aviation fuel fraction of the alkylate were as follows:

| Composition: | Vol. per cent |
|---|---|
| $C_5$ | 10 |
| $C_6$ | 26 |
| $C_7$ | 25 |
| $C_8$ | 18 |
| $C_9+$ | 21 |
|  | 100 |

A. S. T. M. octane number, 86.9.

With ethylene in the olefin charge, about 70 volumes of alkylate were produced per volume of catalyst prior to reactivation. In the case of propylene alone, reactivation was required after about 25 volumes of alkylate had been produced per volume of catalyst. In addition to the extended catalyst life, the improvement obtained with ethylene in the olefin feed was evidenced by higher octane number for the total alkylate, and increased production of especially valuable isoparaffins of six and eight carbon atoms. Similar beneficial results are secured with lower concentrations of ethylene in the feed after the catalyst composition and activity have become relatively stable.

*Example 2*

Isobutane-propylene alkylation was carried out under the conditions of Example 1 with a feed mixture containing an isobutane-propylene molar ratio of 3.9:1. The catalyst was prepared by saturating a 50 per cent aqueous solution of HF with $BF_3$, and was employed in isopentane-ethylene alkylation until reactivation was necessary. This catalyst had declined in specific gravity from 1.78 to 1.50; analysis of a sample showed it to contain about 10 volume per cent of soluble oils, part of which decomposed on addition of water with liberation of ethylene. After reactivation with 5 weight per cent of anhydrous HF, followed by resaturation with $BF_3$, the catalyst was used to produce 80 volumes of isobutane-propylene alkylate per volume of catalyst. The aviation fuel fraction of the alkylate had an A. S. T. M. octane number of 85.0, and contained over 60 volume per cent of $C_7$ isoparaffins of highly branched structure boiling between about 170 and 195° F.

*Example 3*

In the alkylation of isobutane with isobutylene in the presence of boron-fluoride hydrate HF catalyst containing equi-molal proportions of the hydrate and HF, the conditions were as follows: Temperature, 108–115° F.; pressure, 60 pounds gage; contact time 12 minutes. The feed stock contained isobutane and isobutylene in a molar ratio of 8:1. The total alkylate yield was 175 weight per cent of the isobutylene charge, and the aviation fuel blending stock contained about 60 weight per cent of isooctanes. The A. S. T. M. octane number of this blending stock was 89.0.

When the alkylation was repeated under similar conditions but with equi-molal quantities of ethylene and isobutylene in the olefin feed, catalyst life was almost doubled although the isobutane-olefin ratio of the feed was reduced to 4:1. The total alkylate yield was 190 weight per cent of the olefin charged and the A. S. T. M. octane number was 91.0. The aviation alkylate contained about 30 volume per cent each of $C_8$ and $C_8$ isoparaffins. In this case a higher yield of a more valuable alkylate was obtained. Side reactions involving the isobutylene were reduced although the olefin concentration of the feed was increased.

Similar results was obtained when employing boron fluoride-phosphoric acid catalyst in isobutane-isobutylene alkylation in the presence of ethylene equivalent to 40 mol per cent of the combined olefin feed.

*Example 4*

Isobutane may be alkylated with pentene-2 in the presence of boron-fluoride-phosphoric acid catalyst at 100 to 120° F. and 100 pounds gage pressure to produce alkylate containing principally $C_8$ and $C_9$ isoparaffins in the aviation fuel boiling range. When the olefin feed contains 10 mol per cent of ethylene, the aviation alkylate contains a proportionally increased amount of high octane $C_8$ hydrocarbons and substantially decreased amounts of products heavier than isononanes including high-boiling unsaturates produced by pentene polymerization. Catalyst life may be extended as much as 100 per cent based on volumes of alkylate produced between reactivations.

While the foregoing has been relatively specific with regard to methods of practising the invention and to improved results obtainable with ethylene, still further modifications are possible within the scope of the invention, and may be applied by one skilled in the art without departing from the spirit of the teachings or from the scope of the claims.

We claim:

1. The process for the synthesis of paraffin hydrocarbons by catalytic alkylation of low boiling isoparaffins with aliphatic olefins having at least three carbon atoms per molecule which comprises pretreating a catalyst consisting of an inorganic normally liquid material selected from the group consisting of boron fluoride-phosphoric acid complex, boron fluoride hydrate, and mixtures of boron fluoride hydrate with hydrogen fluoride with non-alkylatable hydrocarbon containing an olefin consisting of ethylene under such conditions that said ethylene combines chemically with said catalyst and is thereby transferred to said catalyst, and subsequently alkylating low boiling isoparaffins with aliphatic olefins having at least three carbon atoms per molecule by means of said catalyst so pretreated.

2. The process of claim 1 wherein said pretreatment is carried out with liquid hydrocarbon containing ethylene as the sole olefin.

3. The process for the synthesis of paraffin hydrocarbons by catalytic alkylation of low boiling isoparaffins with aliphatic olefins having at least three carbon atoms per molecule which comprises pretreating a catalyst consisting of boron fluoride-phosphoric acid complex with non-alkylatable hydrocarbon containing an olefin consisting of ethylene under such conditions that said ethylene combines chemically with said catalyst and is thereby transferred to said catalyst, and subsequently alkylating low boiling isoparaffins with aliphatic olefins having at least three carbon atoms per molecule by means of said catalyst so pretreated.

4. The process for the synthesis of paraffin hydrocarbons by catalytic alkylation of low boiling isoparaffins with aliphatic olefins having at least three carbon atoms per molecule which comprises pretreating a catalyst consisting of boron fluoride hydrate with non-alkylatable hydrocarbon containing an olefin consisting of ethylene under such conditions that said ethylene combines chemically with said catalyst and is thereby transferred to said catalyst, and subsequently alkylating low boiling isoparaffins with aliphatic olefins having at least three carbon atoms per molecule by means of said catalyst so pretreated.

5. The process for the synthesis of paraffin hydrocarbons by catalytic alkylation of low boiling isoparaffins with aliphatic olefins having at least three carbon atoms per molecule which comprises pretreating a catalyst consisting of a mixture of boron fluoride hydrate and hydrogen fluoride with non-alkylatable hydrocarbon containing an olefin consisting of ethylene under such conditions that said ethylene combines chemically with said catalyst and is thereby transferred to said catalyst, and subsequently alkylating low boiling isoparaffins with aliphatic olefins having at least three carbon atoms per molecule by means of said catalyst so pretreated.

WALTER A. SCHULZE.
WILLIAM N. AXE.